US008649810B2

(12) United States Patent
Reinhold et al.

(10) Patent No.: US 8,649,810 B2
(45) Date of Patent: Feb. 11, 2014

(54) METHOD AND APPARATUS FOR PROLONGING BATTERY CHARGE LIFE IN A MOBILE COMMUNICATION DEVICE USING A TEXT MESSAGING TYPE PROTOCOL FOR CALLS

(75) Inventors: Stanley Reinhold, Allentown, PA (US); Xiao-An Wang, Allentown, PA (US)

(73) Assignee: Agere Systems LLC, Allentown, PA (US)

( * ) Notice: Subject to any disclaimer, the term of this patent is extended or adjusted under 35 U.S.C. 154(b) by 257 days.

(21) Appl. No.: 12/446,485

(22) Filed: Apr. 21, 2009

(65) Prior Publication Data

US 2011/0124352 A1     May 26, 2011

(51) Int. Cl.
*H04W 4/00*     (2009.01)

(52) U.S. Cl.
USPC ............ 455/466; 455/412.2; 455/414.1; 455/414.4; 455/415; 455/458

(58) Field of Classification Search
USPC .............................................. 455/466
See application file for complete search history.

(56) References Cited

U.S. PATENT DOCUMENTS

| 5,797,094 | A | 8/1998 | Houde et al. |
| 2004/0057562 | A1 | 3/2004 | Myers et al. |
| 2005/0041640 | A1 | 2/2005 | Nasielski et al. |
| 2005/0159959 | A1* | 7/2005 | Benco et al. ............... 704/277 |
| 2006/0293089 | A1* | 12/2006 | Herberger et al. ........... 455/567 |
| 2007/0072602 | A1* | 3/2007 | Iyer et al. .................. 455/426.1 |
| 2007/0254596 | A1* | 11/2007 | Corson et al. ................. 455/68 |

FOREIGN PATENT DOCUMENTS

| DE | 101 20 704 A1 | 7/2002 |
| WO | WO 01/43465 A1 | 6/2001 |

OTHER PUBLICATIONS

European Search Report from Mar. 26, 2013.

* cited by examiner

*Primary Examiner* — Suhail Khan (57) ABSTRACT

A wireless telecommunication device conducts base station pages at large intervals, such as 30 seconds, rather than the more conventional 0.5 to 4 seconds. The network processes calls placed to that telecommunication device in accordance with an SMS (Short Messaging Service) type protocol rather than a conventional voice call protocol. Particularly, the network sends an SMS to the telephone indicating that a third party is calling (hereinafter termed a "pre-call SMS"). The pre-call SMS indicates the telephone number of the third party. The user of the telephone may call the third party back. In accordance with this protocol, the need to page at very short intervals so as to permit a telephone call to be established in "real-time" is eliminated. Therefore, the paging interval can be increased substantially, thereby substantially prolonging battery charge lifetime of the telephone. In accordance with another aspect of the invention, when a cellular telephone sends a pre-call SMS, it temporarily decreases its paging interval to a more conventional interval such as 0.5 seconds for a predetermined period of time (e.g., 1-5 minutes) after placing a call so that, if the called party returns the call, the calling party will receive the return call in real-time and be able to answer the incoming call and establish a voice call.

5 Claims, 4 Drawing Sheets

METHOD AND APPARATUS FOR PROLONGING BATTERY CHARGE LIFE IN A MOBILE COMMUNICATION DEVICE USING A TEXT MESSAGING TYPE PROTOCOL FOR CALLS

FIELD OF THE INVENTION

The invention pertains to wireless communication devices and particularly such devices that operate on battery power. More particularly, the invention pertains to a method and apparatus for minimizing power requirements and prolonging battery charge life in such devices.

BACKGROUND OF THE INVENTION

Figure 1:
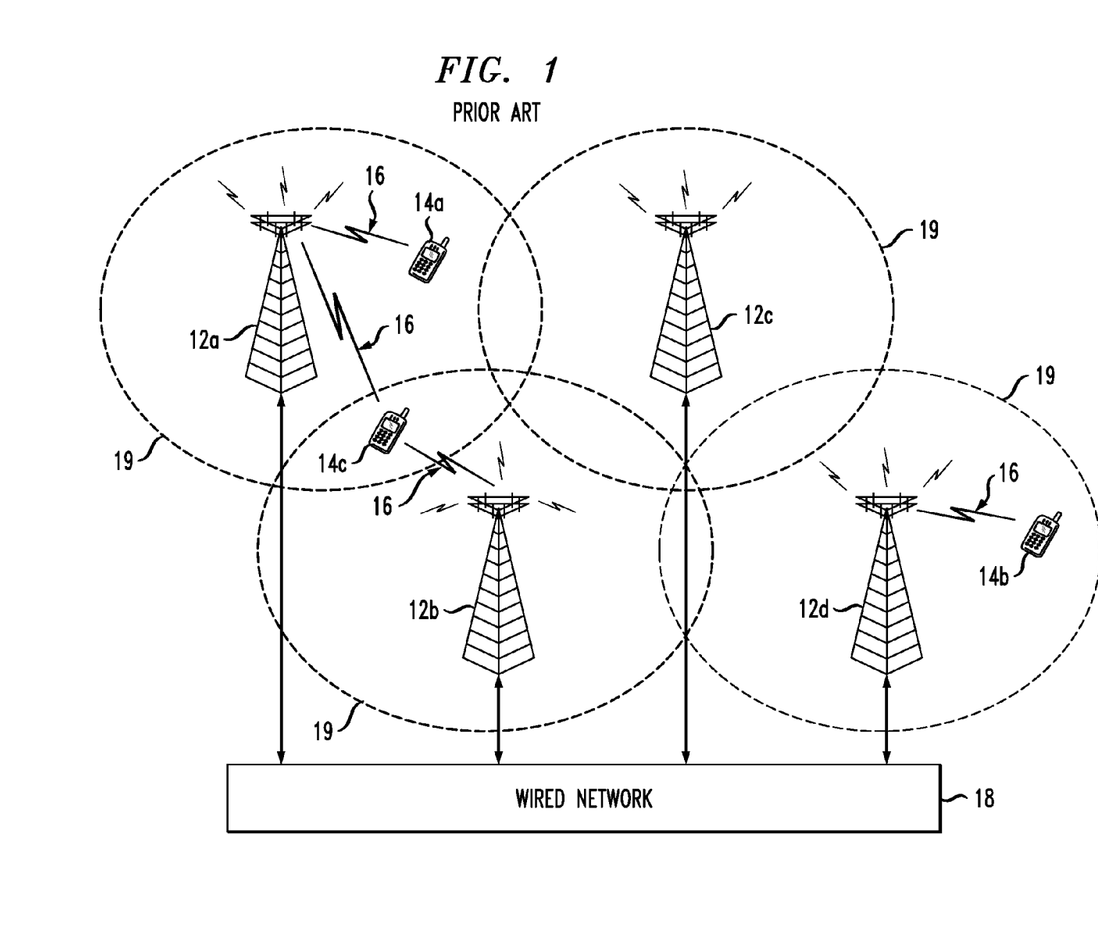
FIG. 1 is a block diagram illustrating some of the basic components of a conventional wireless telecommunication network device.

A mobile telecommunication device, such as a cellular telephone or a police mobile radio, communicates with other telecommunication devices via transmission and reception of radio frequency (RF) signals with one of a plurality of base stations that is part of a wireless network telecommunication system. The overall telecommunication system may, of course, also include a wired portion. Using cellular telephones as merely one example, FIG. 1 illustrates the basic components of a typical cellular telephone telecommunication system 10. In such a system, the cellular telephone network comprises a plurality of stationary base stations 12a-12d geographically separated from each other. Each base station covers a small geographic area (or cell) 19 surrounding the base station 12. Cells 19 typically overlap with each other so as to assure full coverage of an overall geographic area. A cellular telephone, such as cellular telephone 14a, establishes contact and communicates with the base station that provides the strongest signal, such as base station 12a, via RF signals 16. The base stations are coupled to a wired communication network 18 that routes the call through the wired network 18 to another telecommunication device. The other telecommunication device may, for instance, be another cellular telephone 14b, in which case, the signals are routed from the wired network 18 to another cellular base station 12d that is close to the other cellular telephone 14b, where they are converted to RF signals 16 broadcast to the cellular telephone 14b.

In order to provide an efficient communication system, it is important for the network as well as each cellular telephone to keep track of which cellular base station is closest to the telephone. Particularly, each telephone 14 should know which cellular base station 18 provides the strongest signal so that it can communicate with that particular base station so as to minimize the amount of power required to transmit to the network and to assure the highest quality connection. Also, the network must keep track of the base station that has the best communication link with each cellular telephone for the same reasons and also so that it can know which base station to route a call to when a call for a particular cellular telephone is made.

Hence, a cellular telephone 14 typically will wake up from a standby mode to listen for a page from the base stations at predetermined intervals. Specifically, during a page, the cellular telephone typically accomplishes three general tasks, namely, (1) monitoring the base station, (2) polling neighboring base stations, and (3) establishing a communication link if the telephone is initiating an outgoing call or is the intended recipient of an incoming call.

With respect to the first above-mentioned task, i.e., monitoring, the cellular telephone typically will have previously determined a default base station with which to communicate based on preceding pages, which would typically be the base station providing the strongest received signal strength for the cell phone. The telephone will The telephone will turn on its receive circuitry to listen for transmissions from the default base station to determine, for instance, if the base station in transmitting a signal indicating that the telephone has an incoming call.

With respect to the second general task performed during a page, i.e., polling, the telephone checks the signal strength of the default base station as well as any other base stations within range to assure that it is always talking to the base station with the strongest signal (presumably, although not necessarily, the closest base station). In a typical neighboring cell polling process, the telephone the telephone listens on the various frequencies that neighboring base stations may be transmitting on for signals from any base stations within range. The cellular telephone then determines the received signal strength of every base station that responds and determines if any of the responding base stations has a received signal strength greater than that of the default base station. Usually, if the telephone determines that there is a neighboring cell base station with a received signal strength greater than the default base station by some predetermined amount, the telephone will switch the default base station to the new base station. Usually, when a cellular telephone switches base stations, it registers with the new base station during the first page after the switch. Registration involves exchanging various information with the base station, such as transmitting to the base station its phone number, electronic serial number, and its home network ID, and receiving from the base station the local network ID (so that the telephone can inform its user whether the telephone is in a home cell or roaming).

The third task is only performed, if, in fact, a call is being initiated or received during a page. Particularly, if the user of the telephone is initiating a telephone call (or data link), then the telephone will also transmit to the base station, during the page, a request for a channel and the data necessary to place the call, such as the telephone number of the called party. Likewise, if a third party has called the cellular telephone (and the call has been properly routed through the wired portion of the telephone network(s) to the correct base station), the base station will transmit to the cellular telephone during the page certain data, such as a message indicating that the telephone has an incoming call and the telephone number of the calling party.

If, during a page, the base station informs the telephone that it has an incoming call, the telephone will issue a designated ring tone to inform its user of the incoming telephone call. The base station usually will provide a predesignated period within which the telephone may "answer" the call (e.g., 10 seconds). Also in accordance with conventional protocol. If the user takes the telephone off hook during the predesignated period provided by the base station, a communication channel with the base station will be set up and the call will be established.

The paging interval, i.e., the time between consecutive pages to a base station, for a typical cellular telephone is in the range of about 0.5-4 seconds and the page transmission itself typically may be about 25-100 milliseconds in duration. The paging interval generally needs to be this short because, in order to receive an incoming call in real time, the telephone must be in very frequent contact with the network so that there is not a long delay between the calling party placing the call and the called party phone ringing.

As previously noted, a cellular telephone page typically may consume about 25-100 milliseconds, of which approximately half is consumed monitoring the default base station (including initiation of a call if a call is being placed) and approximately the other half is consumed polling neighboring cells. During paging, the cellular telephone is consuming substantially more power than when it is in standby mode. Specifically, essentially all of the receive path circuitry, including filters and amplifiers are turned on and adjusted. In addition, the processor is processing data, such as the received signal strength data for all of the neighboring base stations and determining which provides the best signal. Paging is one of the biggest drains on a battery of a cellular telephone. A typical cellular telephone, for instance, may draw on the order of 25 to 50 times as much power from the battery when paging than when it is in standby. A common goal in the design of essentially all mobile telecommunication devices is to minimize power consumption so that the battery can last as long as possible between recharging and/or so as to reduce the size of the battery so that the telecommunication device can be made smaller and lighter.

Accordingly, it is an object of the present invention to minimize power consumption in a wireless communication device.

It is another object of the present invention is to decrease the paging frequency (increase the paging interval) in a wireless communication device.

SUMMARY OF THE INVENTION

A wireless communication device conducts base station pages at large intervals, such as 30 seconds, rather than the more conventional 0.5 to 4 seconds. The device informs the network that it is operating on this mode of operation. The network thereafter processes incoming calls to that telecommunication device in accordance with a text messaging type protocol rather than a conventional voice call protocol. Particularly, the network sends a text message to the telephone indicating that a third party is calling (hereinafter termed a "pre-call text message"). The pre-call text message indicates the telephone number of the third party. The user of the telephone may then call the third party back. In accordance with this protocol, the need to page at very short intervals so as to permit a telephone call to be established in "real-time" is eliminated. Hence, the paging interval can be increased substantially, thereby prolonging battery charge lifetime of the telephone.

In accordance with another aspect of the invention, when a cellular telephone of the present invention attempts to initiate an outgoing call, it temporarily reverts to a conventional mode of operation for a predetermined period of time after placing the call (e.g., 1-5 minutes) and informs the network of such. In this conventional mode of operation, it decreases its paging interval to a more conventional interval such as 0.5 seconds, so that, if the called party returns the call, the calling party will receive the return call in real-time and be able to answer the incoming call and establish a voice call.

DETAILED DESCRIPTION OF THE INVENTION

Text messaging is a service available on most digital mobile phones (and other mobile devices) that permits the sending of short messages (colloquially referred to as text messages or texts) between mobile phones, other handheld devices, and even landline telephones. Short Message Service (SMS) is one standard for text messaging used in connection with the GSM cellular telephone systems such as found in Europe. However, other standards for text messaging are known and used in various parts of the globe. Text messages are also commonly used for ordering ring tones and wallpapers, entering a competition, voting in a call-in survey, notifying a mobile phone owner of a voicemail message, notifying a salesperson of an inquiry, notifying a doctor of a patient with an emergency problem, notifying service personnel of the time and place of a next call, notifying a driver of the address of the next pickup, and the like.

In the SMS protocol, SMS. messages are sent to a Short Message Service Centre (SMSC) which provides a store-and-forward mechanism. The SMSC attempts to send the message to the intended recipient. If a recipient is not reachable, the SMSC queues the message for later retry. Some SMSCs also provide a "forward and forget" option where transmission is tried only once.

Transmission of the short messages between an SMSC and a phone may be achieved through different protocols. Examples include SS7 within the standard GSM MAP framework or TCP/IP within the same standard. Messages are sent with the additional MAP operation forward_short_message, the payload length of which is limited by the constraints of the signaling protocol to 140 bytes. In practice, this translates to either 160 7-bit characters, 140 8-bit characters, or 70 16-bit characters.

It is a very often the case among mobile telephone users that they do not answer incoming calls despite the fact that the telephone is on their person and active. The reasons for this are varied and many. For instance, the person often is engaged in another activity that he or she does not wish to interrupt. Furthermore, the person often does not hear the phone ringing, particularly when in a loud environment. Another possible reason is that the telephone user simply does not wish to speak to the calling party.

Furthermore, many mobile telephone users, particularly younger users have become very comfortable with text messaging. This is believed to be due in part to the same reasons that use of the Internet has become so popular. These reasons include the added privacy of communication by text rather than voice and the greater time available to compose one's thoughts. In fact, the inverse also may have some bearing on this issue, i.e., the general comfort that people have developed with e-mail has made them very comfortable with composing short written messages and reading short written messages on a display screen, of which text messaging is a natural extension. In fact, people often are more comfortable with text messaging than speaking on the telephone.

A typical cell phone battery may provide idle time of three to six days or, alternately, talk time of two to five hours, on a fully charged battery. While this is adequate for most people most of the time, there is an ever-present desire to increase battery charge life in telephones and other mobile communication devices. For instance, people who are traveling away from their home and office may forget their battery charger or, at least, not wish to carry the extra item in their luggage. Also, persons who talk on the telephone frequently or for long periods of time may exhaust the battery charge very quickly since a typical battery provides talk time of only a few hours. This could easily drain the battery in one evening.

Accordingly, it would be beneficial to decrease the drain on the battery of a wireless communication device such as a cellular telephone by any means possible. As previously noted, the need to page a base station on a frequent basis in order to provide reasonably real time service for incoming calls, inter alia, is a significant draw on the battery.

As previously noted, other operations are performed during such pages, such as polling of neighboring cells to determine if there should be a switch of the default base station. However, excellent quality of service can still be maintained with respect to these other functions in the vast majority of circumstances with a much less frequent paging. For instance, in most practical circumstances, it is unlikely that a mobile phone will be moving so fast as to require neighboring cell polling every 0.5 seconds in order to maintain adequate connection to the network. The need to receive incoming calls in essentially real time is the primary factor driving the need to perform paging at such small intervals.

However, the need or even the desire of users of cellular telephones or other wireless communication devices for real time receipt of incoming calls may be highly overestimated. Specifically, since so may users do not even answer many incoming calls, preferring instead to receive text messages and/or to return a voice call at a later time, in accordance with the principles of the present invention, a wireless communication telephone and/or network can be configured so as to substantially reduce the frequency of paging and eliminate or at least reduce real time incoming calls to wireless communication devices.

In accordance with an embodiment of the invention, when the network receives a telephone call intended for a cellular telephone or other wireless communication device, rather than transmitting the call from the base station to the called cellular telephone using conventional voice call protocol (e.g., transmitting a message to the telephone the next time the telephone pages the base station that causes the telephone to ring, then permitting that telephone a predetermined period to respond with an off-hook signal, and, if so, establishing a channel for the voice call), instead the network transmits a text message to the called cellular telephone indicating that an incoming voice call was received and the telephone number of the calling party.

The process can be completely transparent to the calling party. The calling party simply will experience an unanswered call. Specifically, the network may inform the caller that the called party could not be contacted. Alternately, the caller could be placed into the called party's voicemail.

In another embodiment, the pre-call text message protocol is not hidden from the calling party. Rather, the network informs the calling party, such as by voice prompts, that the call has been received by the called party as a pre-call text message. The network may then permit the caller to also leave a voicemail, if desired.

By substituting this type of text message (hereinafter termed a "pre-call text message") protocol for conventional, real-time incoming voice call protocol, the paging interval can be increased substantially. The paging interval should be set based on a number of factors, including, but not limited to, the timing requirements of the other tasks typically performed during a page. These include, most notably, neighboring base station polling in order to maintain a high quality connection between the phone and the network via the cellular base station having a reasonably strong signal relative to the phone. Furthermore, the paging interval should be set with consideration given to the desires or needs of the typical user to be notified of the pre-call text message relatively shortly after the call was placed so that the user can promptly return the call to the calling party, if desired.

With these issues in mind, it may be proper to set the paging interval between about 10 seconds and 5 minutes. More preferably, the paging interval may be set between 15 seconds and 1 minute. Even more preferably, the paging interval may be set to about 30 seconds.

In a preferred embodiment of the invention, the telephone may be equipped with a very simple mechanism that permits the user to return the call when it receives such a text message. For instance, the phone may be programmed such that depressing a particular button while the text message is being displayed initiates a voice call to the telephone number in the pre-call text message. In one particularly preferred embodiments of the invention, when the phone receives one of these pre-call text messages, the phone appends to the message additional text such as "If you wish to call this person back, press SEND". The user can then press the SEND button while the message is being displayed and the telephone will automatically call the telephone number contained in the pre-call text message currently being displayed.

In a preferred embodiment of the invention, the telephone provides the user the option of placing the phone (1) in a conventional mode in which the telephone will page the base station at relatively short intervals, such as 0.5 to 10 seconds and incoming calls will be processed conventionally to cause the telephone to ring, etc. as previously described and well known in the art or (2) in the pre-call text message mode, in which the telephone will page the base station at relatively long intervals, such as 10 seconds to 5 minutes and incoming calls will be processed as described herein. In the embodiments of the invention described above, it is the network that converts the incoming call into a pre-call text message. Accordingly, in such particular embodiments, it would be necessary for the telephone to communicate to the network which of these two modes it is in so that the network, and particularly the default base station, will know whether or not to convert an incoming voice call into a pre-call text message. This can be easily accomplished by including as part of the process of registering with the base station (which typically is performed when a cellular telephone switches default base stations) the steps of informing the base station of which of the two modes the telephone is in. This could be accomplished by adding as little as a single bit to the message transmitted to the base station during registration.

The base station could transmit this data back to another node of the network. However, in a preferred embodiment of the invention, the base station itself performs the task of converting an incoming telephone call intended for a cellular telephone for which it is the current default base station into a pre-call text message. Therefore, only the base station needs to know this information and, hence, would not need to transmit it any further upstream in the network.

In an alternate embodiment of the invention, the network need not be altered at all. Instead, all of the programming necessary to adapt to the principles of the present invention could be contained solely in the called telephone. For instance, in a conventional cellular telephone network, when the network informs a base station that there is an incoming call for a telephone currently registered in its cell, the base station will wait a first predetermined period of time (e.g., 5 seconds) to receive a page from the telephone. If it receives a page in that time period, during or responsive to the page, the base station transmits a message to the phone notifying it that it has an incoming phone call (and, usually, also providing the telephone number of the calling party) and provide a second predetermined time period, e.g., 10 seconds, for the phone to return an off hook signal to the bas station. On the other hand, if the base station does not receive a page from the phone within 5 seconds of receiving the incoming call message from the network, it responds upstream in the network that the phone was not located.

Accordingly, as long as the paging interval of the telephone is less than the predetermined period, the network may process the incoming call in a conventional manner. However, when the cellular telephone pages the base station and is informed of the incoming call by the base station, the telephone itself generates a pre-call text message (instead of causing the telephone to ring, etc.).

In yet another embodiment, the calling party, either prior to or after dialing a phone number, may be given the opportunity to choose to have the Calls transmitted to the called party as a conventional voice call or as a pre-call text message.

In this embodiment, the conversion to pre-call text message may be performed in the calling party's telephone, in which case the network would require no modifications that would simply receive and transmit the pre-call text message as it would any other text message. In other embodiments, the phone may simply include as part of its transmission data indicating whether it wishes the call to be processed as a pre-call text message or as a conventional voice call. And the network will either perform the conversion or not. The conversion may be performed anywhere in the network, including, but not limited to, in the default base station for the calling party's phone or in the default base station for the called party's phone.

Note that implementations of the invention in which the calling party's phone determines itself or indicates to the network whether or not the call is to be processed as a pre-call text message generally will be entirely compatible with implementations in which the called party's phone indicates whether or not the call should be processed as a pre-call text message. Accordingly, both types of embodiments can be implemented simultaneously and in conjunction.

A typical cell phone has an alert protocol that issues one type of alert to indicate receipt of an incoming voice telephone call and a different type of alert to indicate receipt of a text message. Each such alert typically would comprise a particular sound (or ring tone) and may also involve some form of vibration or visual display. In a preferred embodiment of the invention, a pre-call text message will have an even further, different type of alert, so that the user can distinguish between a conventional incoming voice call, a conventional text message, and a pre-call text message.

Of course, in order to issue a third, different type of alert, the telephone must be able to distinguish between a conventional text message and a pre-call text message. This is not an issue in embodiments in which look called telephone performs on the conversion on its own. However, in those embodiments in which the calling party's telephone or the network performs the conversion, provisions should be made to inform the called telephone of the type of the text message. Again, this can be easily accomplished by adding data to the text message envelope indicating the type of text message, i.e., whether it is a pre-call text message or a conventional text message. The telephone would read this data (which may be as small as a single bit) to determine which type of alert to issue.

One issue raised by the techniques of the present invention is that two cellular telephones that each embody the present invention might never be able to establish an actual voice telephone call with each other because the network (or the originally calling phone) would convert the return call into a pre-call text message, thus leading to a situation in which a voice telephone call cannot be initiated between the two phones. This problem can be solved in several ways. For instance, in embodiments of the invention in which the network performs a conversion or the called telephone performs the conversion, when a telephone in the pre-call text message mode of operation initiates an outgoing call, it automatically enters the conventional mode of operation for a predetermined period of time there after, such as 5 to 10 minutes. Therefore, if the called party returns the call within 5 to 10 minutes, the call will be received as a conventional voice call, rather than a pre-call text message. Alternately, the telephone may temporarily enter a third type of mode in which it pages the base station at the smaller interval used in the conventional mode, but still processes incoming calls using the pre-call text message protocol as described herein, except for those incoming calls originating from the called party. In those embodiments of the invention in which the called telephone performs the conversion to pre-call text message, this can easily be accomplished by suitable programming of that phone since the telephone already has the information as to the telephone number(s) to which calls have been recently made from that telephone.

In another embodiment, the network can store for a certain period of time all telephone calls that were delivered to the called phone as pre-call text messages (storing at least the telephone numbers of the two telephones) and simply process any calls between the two telephone numbers in the reverse direction (or, alternately, in both the forward and reverse directions) corresponding to conventional voice call protocol.

PCT patent application number PCT/US06/45941, incorporated herein fully by reference, owned by the same assignee as the present application and filed on even date herewith, entitled METHOD AND APPARATUS FOR PROLONGING BATTERY CHARGE LIFE IN A MOBILE COMMUNICATION DEVICE USING MOTION DETECTION discloses further methods and apparatus designed to prolong battery charge life in a cellular telephone. Such methods and apparatus involve switching between two or more modes of operation having different paging intervals for neighboring base station polling. The different modes of operation are selected as a function of certain conditions, such as detection by the telephone of whether or not it is in motion.

The present invention may be combined with the methods and apparatus disclosed in the aforementioned co-pending patent application. For instance, when the telephone is in the pre-call text messaging mode, it may be automatically removed from that mode and returned to the conventional mode of operation responsive to detection of motion of the telephone as set forth in the aforementioned patent application.

The invention has been described herein in connection with an exemplary cellular telephone wireless network. However, it will be understood that the invention has much broader application to virtually any wireless communication device and any wireless communication network.

Figure 2:
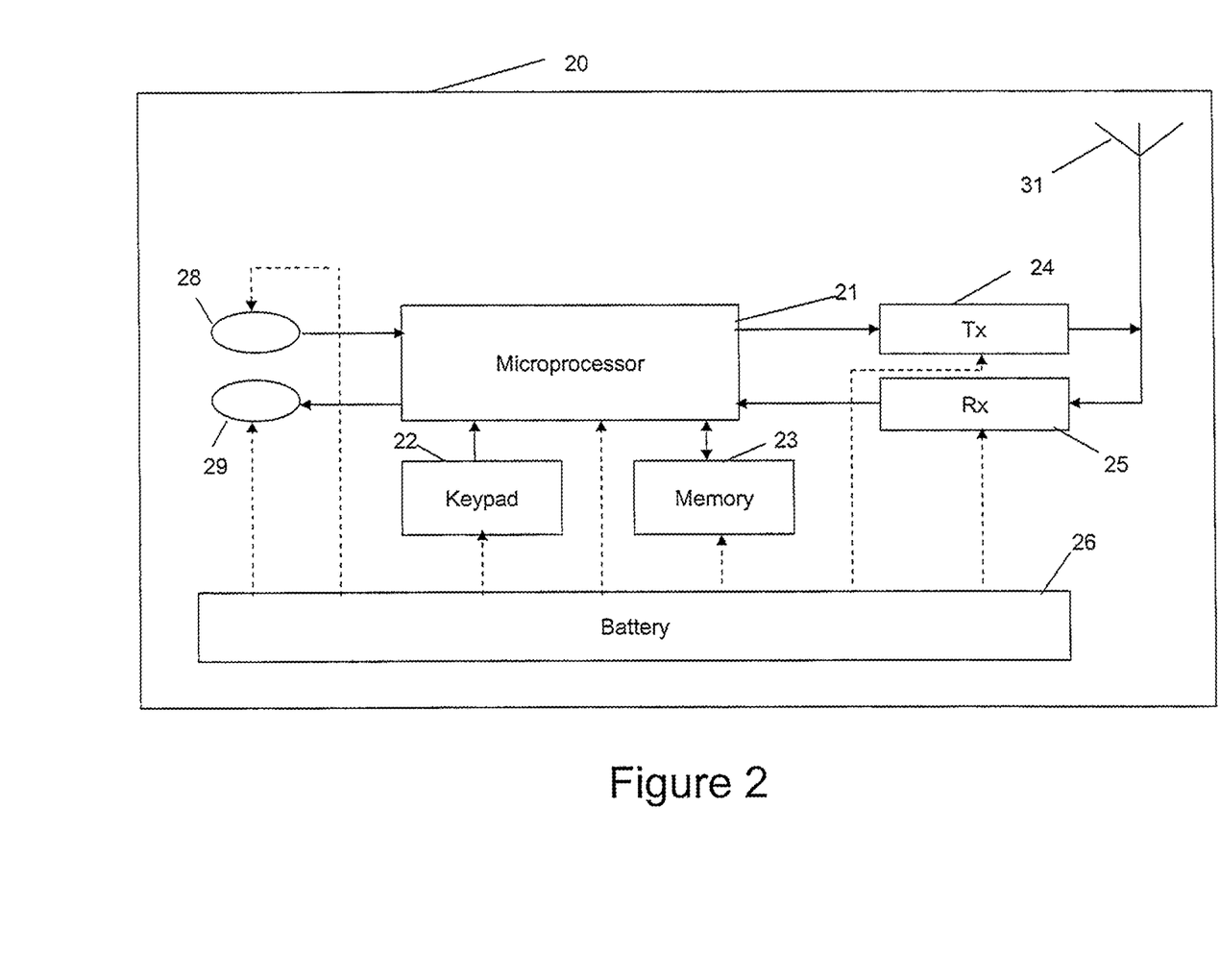
FIG. 2 is a block diagram of some of the basic components of a wireless telecommunication device in accordance with the principles of the present invention.

FIG. 2 is a block diagram of some of the basic components of an exemplary cellular telephone 20 in accordance with the principles of the present invention. The telephone 20 includes one or more microprocessors 21 for controlling the various functions of the telephone. It further includes a memory 23 for storing program instructions and data. The memory 23 may comprise one or more separate memory modules of one or more types. For instance, the program instructions may be stored in a non-volatile memory such as a read-only memory (ROM) or a programmable nonvolatile memory, such as an EPROM or EEPROM, while data may be stored in a volatile memory such as a random access memory (RAM).

Furthermore, the device would include transmitting and receiving circuitry 24 and 25, respectively, and an antenna 31. In addition, the device would further include typical components found in a cellular telephone such as a microphone 28, a speaker 29 and a keypad 22. Some or all of the aforementioned components would be powered via a rechargeable battery 26.

The steps, algorithms, and processes described herein above in connection with the present invention that occur in the telephone generally would be performed by the microprocessor, which, in turn may control the other components of the telephone in accordance with the invention as described herein. However, such steps could be performed by other types of circuitry, including, but not limited to, combinational logic circuitry, a state machine, analog or digital circuitry. For instance, the microprocessor would control the transmit circuitry so as to cause it to transmit a page at the designated page interval depending on the mode selected by the user. Also, it would be programmed to recognize the data received from the base station indicated the type of text message, as previously described.

In accordance with at least some of the embodiments of the invention described above, some of the processes, algorithms and steps described above would be performed by equipment in the network, e.g., equipment located at the base station. In such embodiments, some of the network equipment would be programmed or otherwise modified to operate in accordance with the principles of the present invention as set forth above.

Figure 3A:
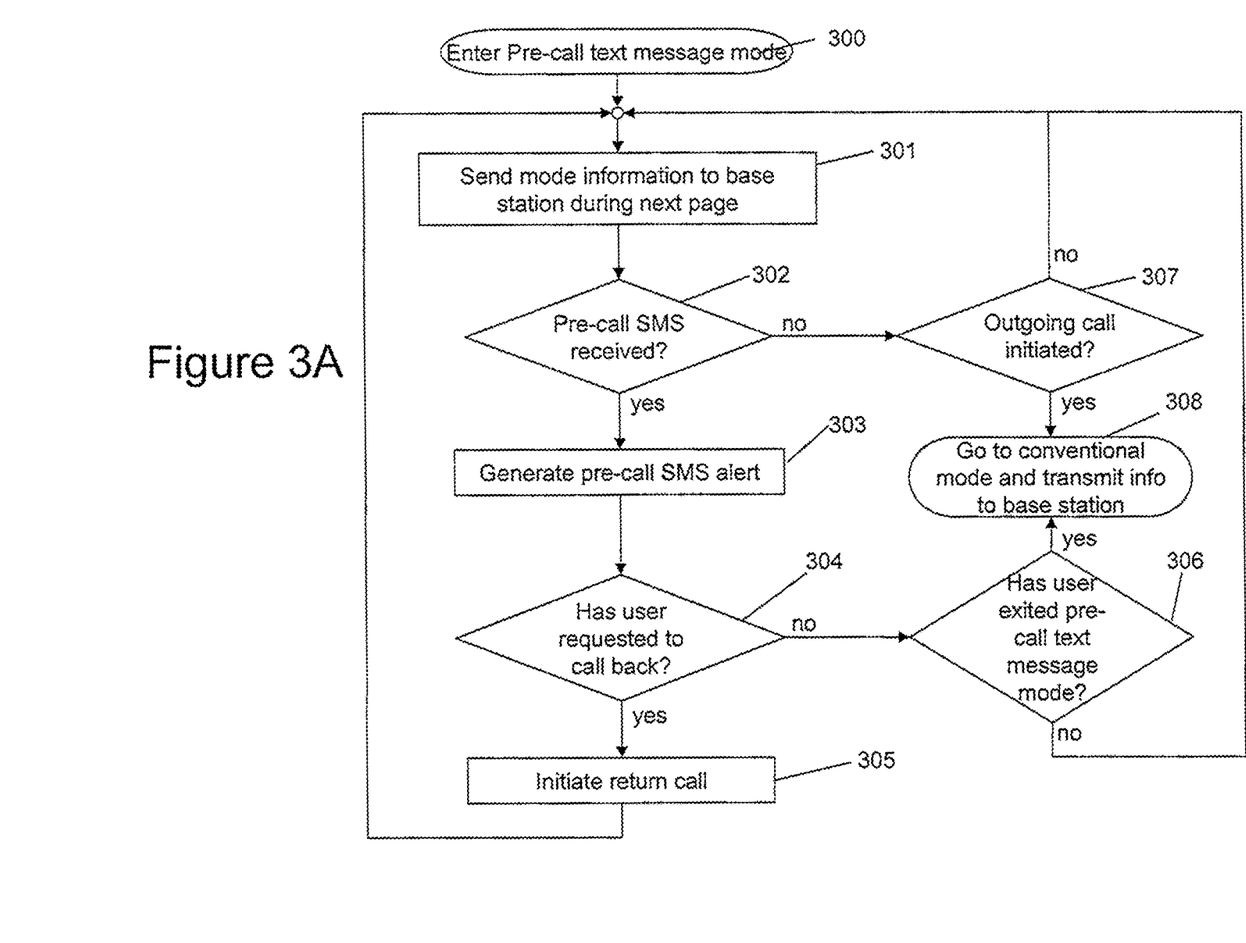
FIG. 3A is a flow diagram illustrating the steps performed in a cellular telephone in accordance with an embodiment of the present invention.
Figure 3B:
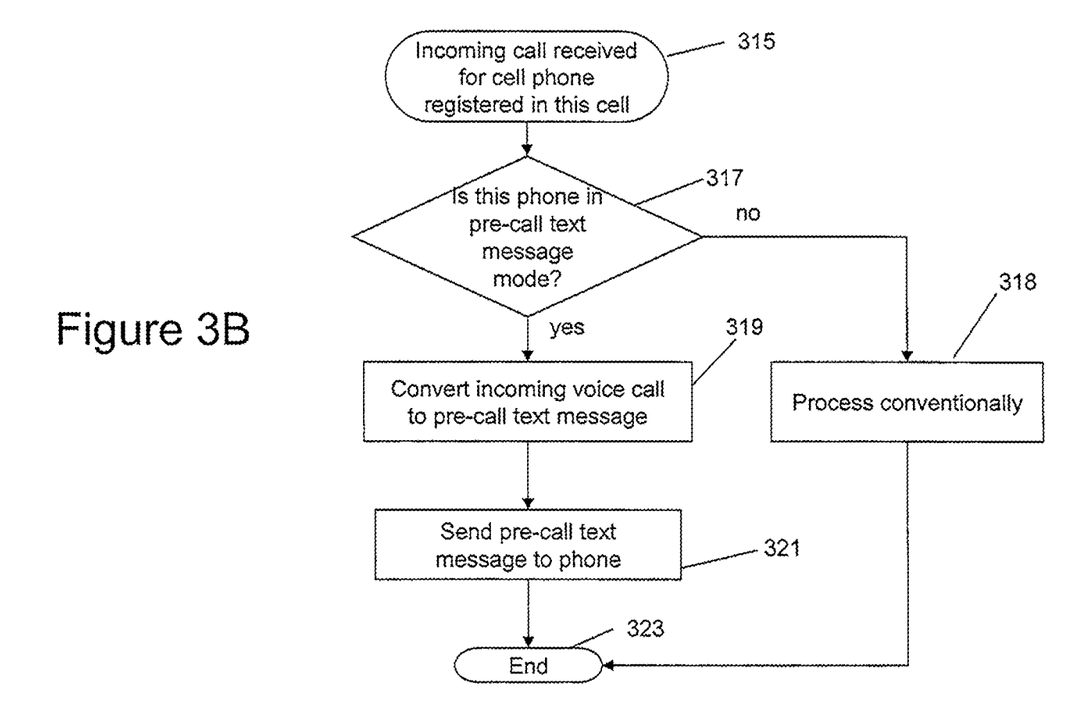
FIG. 3B is a flow diagram illustrating the steps performed in a cellular telephone network in accordance with an embodiment of the present invention.

FIGS. 3A and 3B are flow diagrams illustrating the basic steps in accordance with the present invention that would be performed at the telephone and in the base station, respectively, in accordance with at least one embodiment of the invention in which the conversion is performed in the network.

Referring first to FIG. 3A, which reflects the steps performed in the cellular telephone, when the telephone is placed in the pre-call text message mode, as illustrated in step 300, it first transmits that information to the default base station during the next page after entering the mode (step 301). Then, in step 302, it determines if any pre-call text messages have been received from the base station. Such information would be determined by examining the data transmitted to the phone by the base station during a page.

In any event, when it does receive a pre-call text message, processing proceeds to step 303 in which the telephone generates an alert to notify the user that it has received a pre-call text message. Next, in step 304, if the user of the telephone has operated the keypad or other input device of the phone so as to initiate a call back to the calling party identified in the pre-call text message, processing proceeds to step 305 where the call is initiated. Then processing returns to step 301. If not, processing proceeds to step 306, where the telephone determines whether the user has switched off the pre-call text message mode. If the user has not switched off the pre-call text messaging mode, flow proceeds back to step 301.

In the embodiment illustrated in FIG. 3A, the telephone may send. Its mode information only during the first page after a mode change occurs and every time it switches default base stations.

If, in step 306, the user has turned off pre-call text messaging mode, then the telephone exits pre-call text message mode and switches to conventional mode (step 308) and transmits that mode change information to the base station during the next page.

Returning to step 302, if no pre-call text message has been received, the telephone determines if the telephone has been used to initiate an outgoing call (step 306). If so, in one embodiment of the invention, the telephone automatically exits pre-call text messaging mode and enters conventional mode (step 308). However, in other embodiments of the invention as describe above, the telephone may be programmed to enter pre-call text messaging mode only for a predetermined period of time (e.g., 10 minutes) and/or only with respect to incoming calls received from recently called telephone numbers.

The operation of the telephone in conventional mode is not illustrated in any further detail in the flowcharts since it is largely conventional.

FIG. 3A illustrates merely one very simple embodiment of the invention. It will be understood by those skilled in the art that many details have been omitted and that there are many other potential embodiments of the invention.

Referring now to FIG. 3B, it illustrates processing in the network (preferably, the base station) when an incoming call is received for a cellular telephone that is presently registered with this base station as its default base station. The process is entered at step 315 when such a call is received in the network. Next, in step 317, it is determined if that cell phone is registered in the pre-call text messaging mode. If not, flow proceeds to step 318, in which the call is processed in a conventional manner. The operation of the base station in conventional mode is not illustrated in any further detail since it is largely conventional.

If, however, the telephone is in the pre-call text message mode, processing instead proceeds to step 319, in which the base station converts the incoming voice call to a pre-call text message. Processing continues to step 321, in which the base station sends the pre-call text message to the telephone. The process ends at step 323.

FIG. 3B illustrates merely one very simple embodiment of the invention. It will be understood by those skilled in the art that many details have been omitted and that there are many other potential embodiments of the invention, including some of the embodiments that have been described above.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of processing a telephone call in a communication network, said method comprising the steps of:

receiving a first call from a first telephone to a second telephone, said first call originating as a voice call, wherein said second telephone may be in a first mode of operation or a second mode of operation;

only if said second telephone is in said first mode of operation, converting said voice call into a text message indicating an identity of the first telephone;

transmitting said first call to said second telephone;

responsive to said second telephone being in said first mode, said second telephone paging a base station periodically at intervals of a first predetermined length; and responsive to said second telephone being in said second mode, said second telephone paging said base station periodically at intervals of a second predetermined length shorter than said first predetermined length.

2. The method of claim 1 wherein said paging interval in said first mode of operation is between 10 seconds and 5 minutes.

3. A method of processing a telephone call from a first telephone to a second, wireless telephone in a communication network that is at least in part wireless, said method comprising the steps of:

said second telephone registering with said network, said registration including informing said network whether said second telephone is in a first mode or a second mode, wherein said second telephone pages said network at intervals;

receiving a call from said first telephone to said second telephone, said call originating as a voice call;

if said second telephone is in said first mode, converting said voice call into a text message indicating an identity of the first telephone;

transmitting said call to said second telephone;

responsive to said second telephone being in said first mode, said second telephone paging a base station periodically at first predetermined intervals; and responsive to said second telephone being in said second mode, said second telephone paging said base station periodically at second predetermined intervals shorter than said first predetermined intervals.

4. The method of claim 3 further comprising the step of:

responsive to said second telephone initiating an outgoing voice call when in said first mode, said second telephone automatically switching to said second mode.

5. The method of claim 3 wherein said second telephone switches to said second mode for a predetermined period of time after initiating an outgoing call and then returns to said first mode after said predetermined period.

* * * * *